United States Patent
Kellner

(10) Patent No.: US 9,090,290 B2
(45) Date of Patent: Jul. 28, 2015

(54) DOOR SILL ASSEMBLY

(71) Applicant: Dr. Ing. h.c. F. Porsche Aktiengesellschaft, Stuttgart (DE)

(72) Inventor: Philipp Kellner, Wernau (DE)

(73) Assignee: Dr. Ing. h.c.F. Porsche Aktiengesellschaft (DE)

( * ) Notice: Subject to any disclaimer, the term of this patent is extended or adjusted under 35 U.S.C. 154(b) by 0 days.

(21) Appl. No.: 14/542,991

(22) Filed: Nov. 17, 2014

(65) Prior Publication Data

US 2015/0145288 A1    May 28, 2015

(30) Foreign Application Priority Data

Nov. 28, 2013  (DE) .......................... 10 2013 113 164

(51) Int. Cl.
*B62D 25/00* (2006.01)
*B62D 25/02* (2006.01)
*B62D 29/00* (2006.01)

(52) U.S. Cl.
CPC ............ *B62D 25/025* (2013.01); *B62D 29/008* (2013.01)

(58) Field of Classification Search
CPC .................................................. B62D 25/025
USPC ............ 296/209, 193.06, 203.03, 187.12, 29, 296/193.07
See application file for complete search history.

(56) References Cited

U.S. PATENT DOCUMENTS

| 6,139,094 A * | 10/2000 | Teply et al. .............. 296/203.03 |
| 6,217,109 B1 * | 4/2001 | Okana et al. ............. 296/203.03 |
| 6,357,822 B1 * | 3/2002 | Panoz et al. ................... 296/209 |
| 2012/0086238 A1 | 4/2012 | Tan |
| 2014/0327274 A1 * | 11/2014 | Baldwin ....................... 296/209 |

FOREIGN PATENT DOCUMENTS

| DE | 43 33 557 | 4/1995 |
| DE | 43 35 043 | 4/1995 |
| DE | 10 2006 015 414 | 10/2007 |
| DE | 10 2009 058 976 | 6/2011 |
| DE | 10 2011 115 040 | 4/2012 |
| DE | 10 2012 001 938 | 8/2013 |

OTHER PUBLICATIONS

German Search Report of Aug. 13, 2014.

* cited by examiner

*Primary Examiner* — Joseph D Pape
(74) *Attorney, Agent, or Firm* — Gerald E. Hespos; Michael J. Porco; Matthew T. Hespos

(57) ABSTRACT

The invention relates to a door sill assembly for a vehicle body, having a door sill outer part connected to a door sill inner part, wherein the door sill parts are, in part, constituents of a floor assembly of the vehicle. According to the invention, the door sill outer part is provided from an extruded aluminum profile and is connected to the door sill inner part by way of longitudinally running joining flanges that correspond to one another, wherein the door sill inner part is provided at least from a sheet aluminum part and a sheet steel part connected to said sheet aluminum part.

17 Claims, 2 Drawing Sheets

DOOR SILL ASSEMBLY

CROSS REFERENCE TO RELATED APPLICATION

This application claims priority under 35 USC 119 to German Patent Appl. No. 10 2013 113 164.6 filed on Nov. 28, 2013, the entire disclosure of which is incorporated herein by reference.

BACKGROUND

1. Field of the Invention

The invention relates to a door sill assembly for a vehicle body.

2. Description of the Related Art

DE 10 2009 058 976 A1 discloses a door sill assembly for a vehicle body having a door sill hollow profile formed by a door sill inner part, a door sill outer part and a door sill side part as closure part. The door sill assembly is connected to a floor assembly or a floor support of the vehicle.

It is an object of the invention to provide a lightweight door sill assembly for a vehicle formed from an aluminum material and configured for simple connection to a steel vehicle pillar.

SUMMARY OF THE INVENTION

According to the invention, a door sill assembly is provided having at least an outer part and an inner part. The door sill assembly is connected to a vehicle pillar of the vehicle. The door sill outer part is provided from an extruded aluminum profile. The door sill inner part is formed from at least a sheet aluminum part and a sheet steal part connected to the sheet aluminum part. The outer part and the inner part are connected to each other by at least one longitudinally running joining flange formed on each of the inner part and the outer part.

The sheet steel part is preferably held between the door sill outer part and the sheet aluminum part.

Furthermore, the door sill outer part forms a hollow profile with internal longitudinally running webs. The door sill outer part may be a constituent of a side part structure of the vehicle. The webs serve for stabilizing the door sill assembly and for absorbing energy in the event of a crash. The door sill inner part may be formed as a constituent of a floor assembly of the vehicle and may be connected to the floor assembly or formed in one piece with the floor assembly.

The formation of the door sill inner and outer parts from aluminum yields a lightweight door sill. However, a connection of aluminum portions of the door sill to the vehicle pillar composed at least partially of hot-worked steel can only be achieved mechanically with great outlay. Thus, the door sill inner part is formed with the sheet steel part to facilitate the connection between the steel pillar and the door sill inner part.

Furthermore, according to a further advantageous embodiment of the invention, the door sill inner part has a substantially U-shaped cross section with opposite first and second legs. The joining flanges of the inner part project at an angle from the leg portions. The angled joining flanges on the door sill parts have flange surfaces which, during the joining of the side part of the vehicle to the floor assembly, permit a displacement in x and z planes for tolerance compensation purposes.

The door sill inner part is oriented with the first and second legs projecting towards the door sill outer part, such that a connection to the door sill outer part by way of the joining flanges yields, in effect, a reinforced door sill profile. The possibility of a displacement in x and z planes is necessary in order to realize tolerance compensation during the assembly process, in particular during the joining of the side part to the floor assembly.

The sheet steel part preferably has a substantially Z-shaped cross-section and has first and second legs projecting away from each other. The first leg of the Z-shaped cross-section is connected at least partially to the at least one joining flange of the door sill outer part and the second leg is connected to an upright wall of the sheet aluminum part.

In one advantageous embodiment, the sheet aluminum part has a substantially Z-shaped cross-section in a region in which the sheet steel part is provided and a substantially U-shaped cross-section outside the region in which the sheet steel part is provided.

An exemplary embodiment of the invention is illustrated in the drawings and will be described in more detail below.

DETAILED DESCRIPTION OF THE RELATED ART

Figure 1:
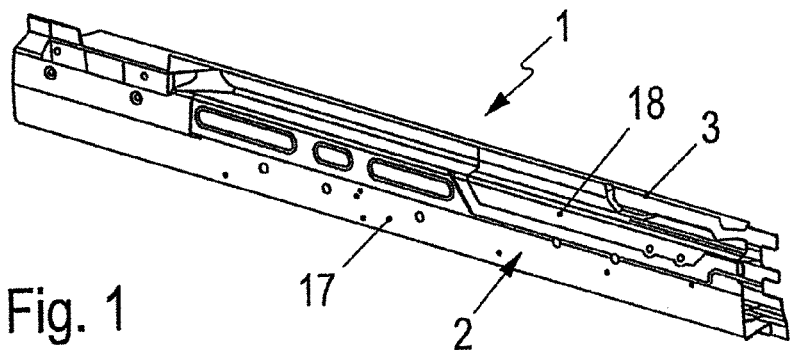
FIG. 1 shows a door sill assembly having a door sill inner part and a door sill outer part, viewed from the front and the inside.

A door sill assembly 1 for a vehicle body comprises a door sill outer part 3 fastened to a door sill inner part 2.

The door sill outer part 3 is formed from an extruded aluminum profile. Longitudinally running joining flange 6 are formed on the door sill outer part 3. The door sill inner part 2 is comprised of at least a sheet aluminum part 17 and a sheet steel part 18. Longitudinally running joining flange 5 are formed on the door sill inner part 2. The door sill outer part 3 is connected to the door sill inner part 2 by way of the longitudinally running joining flanges 5, 6, which correspond to one another.

Figure 4:
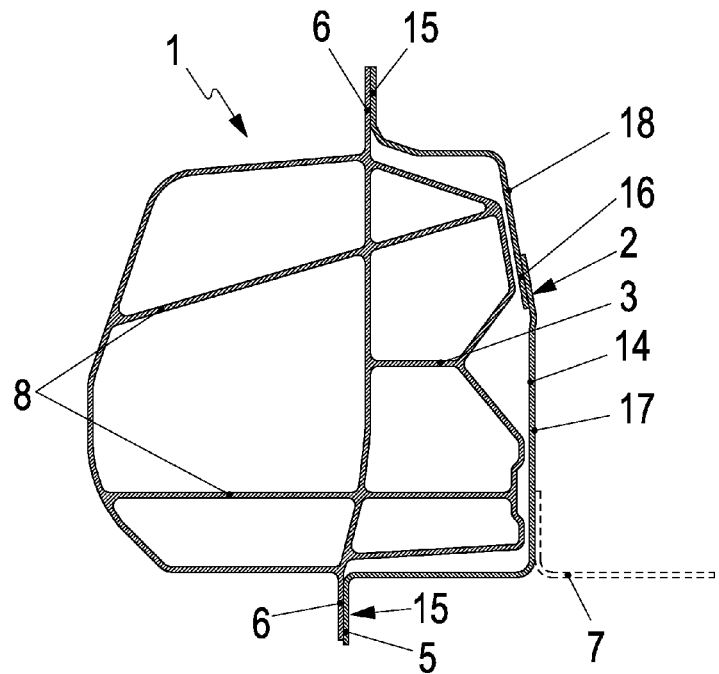
FIG. 4 shows a cross section through the door sill assembly with the door sill outer part and the door sill inner part in the region of the sheet steel part.
Figure 5:
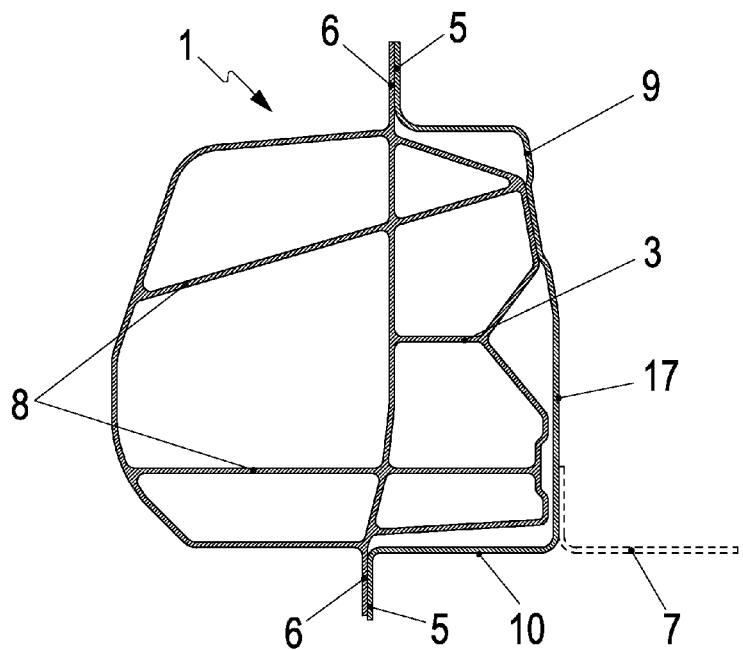
FIG. 5 shows a cross section through the door sill assembly with the door sill outer part and the door sill inner part outside the region of the sheet steel part.

In the exemplary embodiment shown, the sheet steel part 18 is arranged between the door sill outer part 3 and the sheet aluminum part 17. The sheet steel part 18 and the sheet aluminum part 17 form a floor assembly together with a floor panel 7 indicated merely by dashed lines in FIGS. 4 and 5 and with further components that are not illustrated.

A different arrangement of the sheet steel part 18, for example on an outer side of the sheet aluminum part 17, is likewise conceivable.

The door sill outer part 3 has a hollow profile with internal longitudinally running webs 8. The door sill outer part 3 may be a constituent of a side part structure of the vehicle. The webs 8 stabilize the cross section and absorb energy in the event of a crash.

The door sill inner part 2 has a U-shaped cross-section at least in the region of the door sill. The door sill inner part 2 has first and second substantially horizontally oriented and turned-up legs 9, 10. The joining flanges 5 project from the legs 9, 10 at an angle. The joining flanges 5 of the inner door sill part 2 and the joining flanges 6 of the outer door sill part 3 are formed with flange surfaces 11, 12 which, during the joining of the side part structure to the floor assembly, permit a displacement in x and z planes for tolerance compensation purposes.

The sheet steel part 18 has a Z-shaped cross-section. As can be seen in detail from FIG. 4, in profile the sheet steel part 18 has first and second legs 15, 16 projecting in opposite directions. The first leg 15 of the sheet steel part 18 is held to the upper joining flange 6 of the door sill outer part 3 and the second leg 16 of the sheet steel part 18 is held on an upright wall 14 of the sheet aluminum part 17, and bears partially against the door sill outer part 3.

Figure 2:
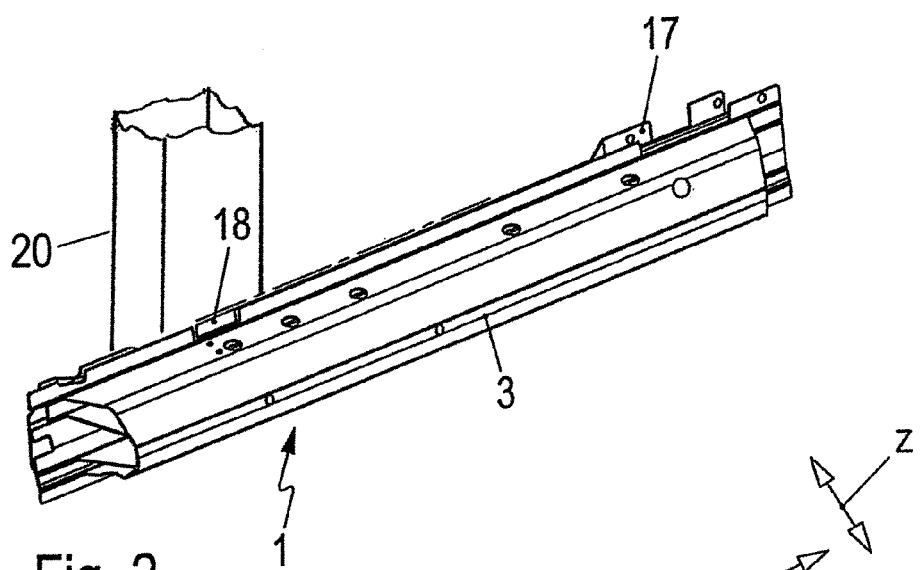
FIG. 2 shows the door sill assembly of FIG. 1 from the front and the outside.
Figure 3:
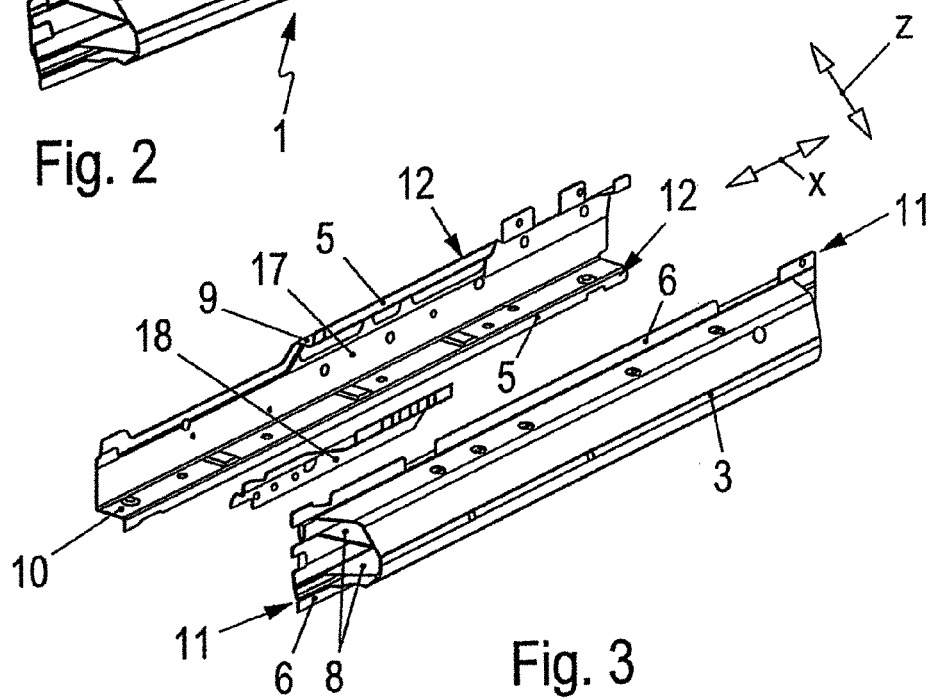
FIG. 3 is an exploded illustration, in a view from the front and the outside, of the door sill assembly with the individual components of the door sill.

The sheet steel part 18 may form an entire upper part, an entire front part, or an upper, front part of the door sill inner part 2, and can be connected to a steel A or B pillar 20, as shown in FIG. 2, by way of a joining process. It is however also conceivable for the sheet steel part 18 to form a rear upper or central upper part of the door sill inner part 2.

To realize a particularly lightweight embodiment, the Z-shaped sheet steel part 18 is arranged only in a region in which the door sill is connected to a steel A or B pillar. Therefore, the Z-shaped cross-section of the sheet aluminum part 17 may be formed only in the region in which sheet steel part 18 is provided, as can be seen in particular in FIG. 4. By contrast, outside the region of the sheet steel part 18, the sheet aluminum part 17 has a U-shaped cross section, as can be clearly seen from FIG. 5.

What is claimed is:

1. A door sill assembly for a vehicle body, having a door sill outer part connected to a door sill inner part, wherein the door sill parts are, in part, constituents of a floor assembly of the vehicle, characterized in that the door sill outer part is provided from an extruded aluminum profile and is connected to the door sill inner part by way of longitudinally running opposed joining flanges of the outer part and the inner part that are joined in surface contact with one another at top and bottom ends of the door sill assembly, wherein the door sill inner part is provided at least from a sheet aluminum part and a sheet steel part connected to said sheet aluminum part.

2. The door sill assembly of claim 1, wherein the sheet steel part is held between the door sill outer part and the sheet aluminum part.

3. The door sill assembly of claim 1, wherein the door sill outer part, which is composed of the extruded aluminum profile, forms a hollow profile with internal longitudinally running webs and is a constituent of a side part structure of the vehicle.

4. The door sill assembly of claim 1, wherein the door sill inner part, as a constituent of the floor assembly, is connected to the floor assembly.

5. The door sill assembly of claim 1, wherein the door sill inner part is of substantially U-shaped cross section with an upright panel and turned-up legs extending from top and bottom ends of the upright panel, the turned-up legs of said inner part have arranged thereon the joining flanges of the inner part for connecting to the joining flanges of the outer part, the joining flanges of inner part being angled correspondingly with respect to the joining flanges of the door sill outer part.

6. The door sill assembly of claim 1, wherein the joining flanges on the door sill inner and outer parts have flange surfaces that permit a displacement in x and z planes for tolerance compensation purposes when joining the door sill assembly to the floor assembly.

7. The door sill assembly of claim 1, wherein the sheet steel part is of substantially Z-shaped form in cross section and one leg is connected at least partially to one of the joining flanges of the door sill outer part and a further leg is connected to an upright wall of the sheet aluminum part.

8. The door sill assembly of claim 1, wherein the sheet aluminum part is of substantially Z-shaped form in cross section in a region in which the sheet steel part is provided.

9. The door sill assembly of claim 1, wherein the sheet aluminum part is of substantially U-shaped form in cross section outside a region in which the sheet steel part is provided.

10. The door sill assembly of claim 1, wherein the sheet steel part, as a constituent of the door sill inner part, can be connected to a steel A or B pillar of the vehicle by way of a joining process.

11. A door sill assembly for a vehicle, comprising:
a door sill outer part defining an extruded aluminum profile and having longitudinally running joining flanges projecting at top and bottom sides; and
a door sill inner part having a sheet aluminum part with longitudinally running joining flanges projecting at top and bottom sides and joined to the joining flanges of the door sill outer part, the door sill inner part further including a sheet steel part having a substantially Z-shaped cross section with a first leg connected to a part of the joining flange of the door sill outer part and a second leg connected to an upright wall of the sheet aluminum part of the door sill inner part.

12. The door sill assembly of claim 11, wherein the sheet aluminum part is of substantially Z-shaped cross section in a region in which the sheet steel part is provided.

13. The door sill assembly of claim 12, wherein the sheet aluminum part is of substantially U-shaped cross section outside a region in which the sheet steel part is provided.

14. A motor vehicle, comprising:
a substantially vertical A-pillar or B-pillar formed from steel;
a substantially horizontal floor assembly formed at least partly from aluminum; and
a door sill assembly having
a door sill outer part defining an extruded aluminum profile with longitudinally running joining flanges projecting at top and bottom sides; and
a door sill inner part having a sheet aluminum part with longitudinally running joining flanges projecting at top and bottom sides and joined to the joining flanges of the door sill outer part, the sheet aluminum part being joined to the floor assembly, the door sill inner part further including a sheet steel part at a location along the door sill assembly at least partly aligned with the A-pillar or the B-pillar, the sheet steel part having an upper leg with a first region connected directly to the A-pillar or the B-pillar and a second region connected to a part of the joining flange of the door sill outer part, the sheet steel part further having a lower leg connected to an upright wall of the sheet aluminum part of the door sill inner part.

15. The motor vehicle of claim 14, wherein the sheet aluminum part is of substantially Z-shaped cross section in a region in which the sheet steel part is provided.

16. The motor vehicle of claim 15, wherein the sheet aluminum part is of substantially U-shaped cross section outside a region in which the sheet steel part is provided.

17. The motor vehicle of claim 14, wherein the door sill outer part is a hollow profile with longitudinally running internal webs and is a constituent of a side part structure of the motor vehicle.

* * * * *